US010460113B2

(12) United States Patent
Folco et al.

(10) Patent No.: US 10,460,113 B2
(45) Date of Patent: Oct. 29, 2019

(54) SECURITY FIX OF A CONTAINER IN A VIRTUAL MACHINE ENVIRONMENT

(71) Applicant: International Business Machines Corporation, Armonk, NY (US)

(72) Inventors: Rafael C. S. Folco, Santa Bárbara d'Oeste (BR); Plinio A. S. Freire, Campinas (BR); Breno H. Leitão, Araraquara (BR); Rafael P. de Sene, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 15/237,929

(22) Filed: Aug. 16, 2016

(65) Prior Publication Data

US 2018/0053001 A1 Feb. 22, 2018

(51) Int. Cl.
*G06F 21/00* (2013.01)
*G06F 21/57* (2013.01)
*G06F 21/53* (2013.01)
*G06F 9/455* (2018.01)

(52) U.S. Cl.
CPC ........... *G06F 21/577* (2013.01); *G06F 9/455* (2013.01); *G06F 21/53* (2013.01)

(58) Field of Classification Search
CPC .... G06F 21/577; G06F 21/53; G06F 9/45533; G06F 9/455
See application file for complete search history.

(56) References Cited

U.S. PATENT DOCUMENTS

| 8,296,759 | B1* | 10/2012 | Hutchins | G06F 9/45558 |
| | | | | 709/223 |
| 8,312,043 | B2 | 11/2012 | van Riel et al. | |
| 8,464,104 | B2 | 6/2013 | Ganesh et al. | |
| 8,589,947 | B2 | 11/2013 | Potter et al. | |
| 8,677,004 | B2 | 3/2014 | Hegde et al. | |
| 8,990,608 | B1 | 3/2015 | Gupta et al. | |
| 9,104,458 | B1* | 8/2015 | Brandwine | G06F 9/45558 |
| 9,378,108 | B2* | 6/2016 | Cohen | G06F 17/5027 |
| 9,384,029 | B1* | 7/2016 | Brandwine | G06F 9/5077 |
| 9,578,017 | B2* | 2/2017 | Ferguson | H04L 63/0823 |
| 9,635,055 | B2* | 4/2017 | Mathur | H04L 63/168 |
| 9,710,401 | B2* | 7/2017 | Rozas | G06F 12/1408 |
| 9,729,579 | B1* | 8/2017 | Marino | H04L 63/20 |
| 9,766,930 | B2* | 9/2017 | Tarasuk-Levin | G06F 9/4881 |

(Continued)

OTHER PUBLICATIONS

Hamad et al., Secure Live Virtual Machine Migration by Proposed Security Center, IUGNES, Aug. 28, 2015.*

(Continued)

*Primary Examiner* — David Garcia Cervetti
(74) *Attorney, Agent, or Firm* — Edward P. Li

(57) ABSTRACT

A method, a computer program product, and a computer system for a security fix of a container in a VM (virtual machine) environment. A computer detects a container in a container environment, determines whether the container has a security issue performs live migration of the container to a created VM, fixes the security issue of the container in the created VM, and determines whether the security issue is fixed. In response to determining that the security issue is fixed, the computer performs live migration of the created VM to the container environment.

18 Claims, 3 Drawing Sheets

(56) References Cited

U.S. PATENT DOCUMENTS

| | | | |
|---|---|---|---|
| 9,766,945 B2* | 9/2017 | Gaurav | G06F 9/5077 |
| 9,819,694 B2* | 11/2017 | Ponsford | G06F 9/45533 |
| 9,886,300 B2* | 2/2018 | Nakatsu | G06F 9/45558 |
| 10,075,470 B2* | 9/2018 | Vaidya | H04L 63/20 |
| 2006/0054682 A1* | 3/2006 | de la Huerga | G16H 40/20 235/375 |
| 2007/0079307 A1* | 4/2007 | Dhawan | H04L 29/12584 718/1 |
| 2007/0234337 A1* | 10/2007 | Suzuki | G06F 8/61 717/168 |
| 2008/0082977 A1* | 4/2008 | Araujo | G06F 9/455 718/1 |
| 2008/0163239 A1* | 7/2008 | Sugumar | G06F 9/5088 718/105 |
| 2009/0089781 A1* | 4/2009 | Shingai | G06F 9/5088 718/1 |
| 2009/0300414 A1* | 12/2009 | Huang | G06F 11/2097 714/11 |
| 2010/0009758 A1* | 1/2010 | Twitchell, Jr. | H04L 45/586 463/42 |
| 2010/0094948 A1 | 4/2010 | Ganesh et al. | |
| 2011/0004935 A1* | 1/2011 | Moffie | G06F 21/53 726/23 |
| 2011/0209156 A1* | 8/2011 | Box | G06F 9/5077 718/104 |
| 2012/0233282 A1* | 9/2012 | Voccio | G06F 9/461 709/212 |
| 2012/0266147 A1* | 10/2012 | Dawson | G06F 9/547 717/148 |
| 2013/0007090 A1* | 1/2013 | Sankararaman | H04L 67/34 709/201 |
| 2013/0198840 A1* | 8/2013 | Drissi | G06F 21/55 726/22 |
| 2013/0212709 A1* | 8/2013 | Tucker | G06F 21/55 726/29 |
| 2013/0246685 A1* | 9/2013 | Bhargava | G06F 21/00 711/6 |
| 2013/0268799 A1* | 10/2013 | Mestery | H04L 67/10 714/4.2 |
| 2013/0298184 A1* | 11/2013 | Ermagan | G06F 21/54 726/1 |
| 2014/0096131 A1* | 4/2014 | Sonnek | G06F 21/53 718/1 |
| 2014/0137125 A1* | 5/2014 | Hsu | G06F 9/4856 718/102 |
| 2014/0317677 A1* | 10/2014 | Vaidya | H04L 63/20 726/1 |
| 2015/0040217 A1* | 2/2015 | Abuelsaad | H04L 63/1408 726/22 |
| 2015/0052614 A1* | 2/2015 | Crowell | G06F 21/53 726/25 |
| 2015/0154056 A1* | 6/2015 | Chen | G06F 9/4856 718/103 |
| 2015/0220358 A1* | 8/2015 | Ponsford | G06F 9/45533 718/1 |
| 2015/0237066 A1* | 8/2015 | Ponsford | H04L 63/1441 726/22 |
| 2015/0244640 A1* | 8/2015 | Ponsford | H04L 47/70 709/226 |
| 2015/0263983 A1 | 9/2015 | Brennan et al. | |
| 2015/0326588 A1* | 11/2015 | Vissamsetty | H04L 63/1491 726/23 |
| 2015/0326592 A1* | 11/2015 | Vissamsetty | H04L 63/1408 726/24 |
| 2015/0339146 A1* | 11/2015 | Ponsford | G06F 9/45533 718/1 |
| 2015/0378771 A1* | 12/2015 | Tarasuk-Levin | G06F 9/45558 718/1 |
| 2015/0378785 A1* | 12/2015 | Tarasuk-Levin | G06F 9/4881 718/1 |
| 2015/0378831 A1* | 12/2015 | Tarasuk-Levin | G06F 11/1484 714/15 |
| 2015/0378847 A1* | 12/2015 | Tarasuk-Levin | G06F 11/1471 714/19 |
| 2015/0379287 A1* | 12/2015 | Mathur | G06F 21/6209 726/27 |
| 2015/0381589 A1* | 12/2015 | Tarasuk-Levin | H04L 63/0428 713/193 |
| 2016/0098302 A1* | 4/2016 | Ben-Yehuda | G06F 9/5088 718/1 |
| 2016/0182567 A1* | 6/2016 | Sood | H04L 63/20 726/1 |
| 2016/0219019 A1* | 7/2016 | Mathur | H04L 63/0272 |
| 2016/0219073 A1* | 7/2016 | Mathur | H04L 63/168 |
| 2016/0274928 A1* | 9/2016 | Linton | G06F 9/45558 |
| 2016/0283259 A1* | 9/2016 | Mehta | G06F 9/45558 |
| 2016/0283261 A1* | 9/2016 | Nakatsu | G06F 9/45558 |
| 2016/0285958 A1* | 9/2016 | Das | G06F 9/45558 |
| 2016/0292431 A1* | 10/2016 | Sreekanti | G06F 21/602 |
| 2016/0378563 A1* | 12/2016 | Gaurav | G06F 9/5077 718/1 |
| 2016/0378688 A1* | 12/2016 | Rozas | G06F 12/1408 713/190 |
| 2017/0034198 A1* | 2/2017 | Powers | G06F 21/552 |
| 2017/0063722 A1* | 3/2017 | Cropper | G06F 16/285 |
| 2017/0093923 A1* | 3/2017 | Duan | H04L 63/1408 |
| 2017/0098072 A1* | 4/2017 | Stopel | G06F 21/554 |
| 2017/0118174 A1* | 4/2017 | Mathur | H04L 63/0272 |
| 2017/0185533 A1* | 6/2017 | Rozas | G06F 12/1408 |
| 2017/0199770 A1* | 7/2017 | Peteva | G06F 9/5088 |
| 2017/0235951 A1* | 8/2017 | Harrison | G06F 21/51 726/24 |
| 2017/0269953 A1* | 9/2017 | Prey | G06F 9/45558 |
| 2017/0270012 A1* | 9/2017 | Tarasuk-Levin | G06F 11/1471 |
| 2017/0272404 A1* | 9/2017 | Prey | H04L 63/0272 |
| 2017/0339018 A1* | 11/2017 | Prabhu | H04L 41/0893 |
| 2017/0366563 A1* | 12/2017 | Volfman | H04L 63/1491 |
| 2017/0373932 A1* | 12/2017 | Subramanian | H04L 41/0806 |
| 2017/0373933 A1* | 12/2017 | Subramanian | H04L 41/0806 |
| 2017/0373935 A1* | 12/2017 | Subramanian | H04L 41/0816 |
| 2018/0004683 A1* | 1/2018 | Rozas | G06F 12/1408 |
| 2018/0007051 A1* | 1/2018 | Vij | H04L 63/06 |
| 2018/0011699 A1* | 1/2018 | Manthiramoorthy | G06F 8/65 |
| 2018/0074748 A1* | 3/2018 | Makin | G06F 3/0604 |
| 2018/0157517 A1* | 6/2018 | Dong | G06F 9/45558 |
| 2018/0260574 A1* | 9/2018 | Morello | G06F 9/44505 |

OTHER PUBLICATIONS

Krahmer, Sebastian, "Docker 0.11—VMM—Container Breakout", Exploit Database, Published Jun. 18, 2014, 4 pages, <https://www.exploit-db.com/exploits/33808/>.

Mirkin et al., "Containers checkpointing and live migration", Proceedings of the Linux Symposium, vol. Two, Jul. 23-26, 2008, Ottawa, Ontario, pp. 85-90.

"CRIU", CRIU, released Jun. 14, 2016, 4 pages, <http://criu.org/Main_Page>.

"How to migrate a container to a virtual machine?", plesk, Article ID: 117955, created on Oct. 14, 2013, last review on Oct. 20, 2015, 4 pages, <http://kb.plesk.com/en/117955>.

* cited by examiner

SECURITY FIX OF A CONTAINER IN A VIRTUAL MACHINE ENVIRONMENT

BACKGROUND

The present invention relates generally to a Linux container infrastructure, and more particularly to a security fix of a container in a VM (virtual machine) environment.

More and more companies providing hosting and cloud services are adopting Linux container solutions. The Linux container solutions are emerging cloud technology based on fast and lightweight process virtualization that provides users with an environment as close as possible to a standard Linux distribution. Due to the fact that containers are lightweight compared to VMs, more instances of containers can be deployed than VMs on a host and in less time.

One of the main constraints is poor isolation between containers. Since containers share the same kernel as the host, all infrastructure will be vulnerable to kernel exploits, and malicious code may put the whole environment in danger. For example, Shocker is a malicious code that lets a Docker container access any file on a host, including sensitive information; this compromises security of the host and any other Docker containers on the host. The problem regarding the isolation between containers is still an open problem to the IT industry.

SUMMARY

In one aspect, a method for a security fix of a container in a VM (virtual machine) environment is provided. The method is implemented by a computer. The method includes detecting a container in a container environment. The method further includes determining whether the container has a security issue. The method further includes performing live migration of the container to a created VM. The method further includes fixing the security issue of the container in the created VM. The method further includes determining whether the security issue is fixed. The method further includes performing live migration of the created VM to the container environment, in response to determining that the security issue is fixed.

In another aspect, a computer program product for a security fix of a container in a VM (virtual machine) environment is provided. The computer program product comprises a computer readable storage medium having program code embodied therewith. The program code executable to: detect a container in a container environment; determine whether the container has a security issue; perform live migration of the container to a created VM; fix the security issue of the container in the created VM; determine whether the security issue is fixed; and perform live migration of the created VM to the container environment, in response to determining that the security issue is fixed.

In yet another aspect, a computer system for a security fix of a container in a VM (virtual machine) environment is provided. The computer system comprises one or more processors, one or more computer readable tangible storage devices, and program instructions stored on at least one of the one or more computer readable tangible storage devices for execution by at least one of the one or more processors. The program instructions are executable to detect a container in a container environment. The program instructions are executable to determine whether the container has a security issue. The program instructions are executable to perform live migration of the container to a created VM. The program instructions are executable to fix the security issue of the container in the created VM. The program instructions are executable to determine whether the security issue is fixed. The program instructions are executable to perform live migration of the created VM to the container environment, in response to determining that the security issue is fixed.

DETAILED DESCRIPTION

Embodiments of the present invention disclose an automated method for identification, isolation, and fixing of problems in a given container infrastructure. By taking advantage of isolation of a VM environment and information about the inventory of all system and data hosted on a Linux container infrastructure, the automated management process guarantees that a container is working properly or is isolated awaiting for manual maintenance.

In embodiments of the present invention, the automated method is used to guarantee that a given container works properly or is isolated from the rest of the infrastructure; therefore, the automated method guarantee that the container does not exploit any security and/or performance flaws due to a kernel issue or the lack of properly configuration of the container. For example, in the Shocker issue mentioned previously in this document, a container running the malicious code can be separated from a container infrastructure, by creating a VM and performing live migration of the container to the VM. The security fix is then applied to the container in the VM environment, and then the container is reinstated in the original host—the container infrastructure.

A container is migrated to a VM when there is one of the following problems, for example: (1) a monitoring tool detects some potential security flaws in a container infrastructure, (2) there is performance hassling (e.g., disk I/O problems) in the container, and (3) an application in the container does not behave well. While in a VM environment, an apparatus runs some more detailed tests, in an automated fashion. It fixes one or more problems if possible and then moves the VM snapshot back to the container. If the one or more problems persist, the VM is hold on quarantine and waits for human intervention.

Embodiments of the present invention increase security by monitoring and isolating problematic containers, minimize wasting of human efforts in events of massive flaws of containers in a Linux based container environment, and expedite the procedures to recover containers that are not working properly. The main goal of the automated method is to minimize human intervention while keeping a high degree of confidence that the Linux based container environment is taken care of.

Figure 1:
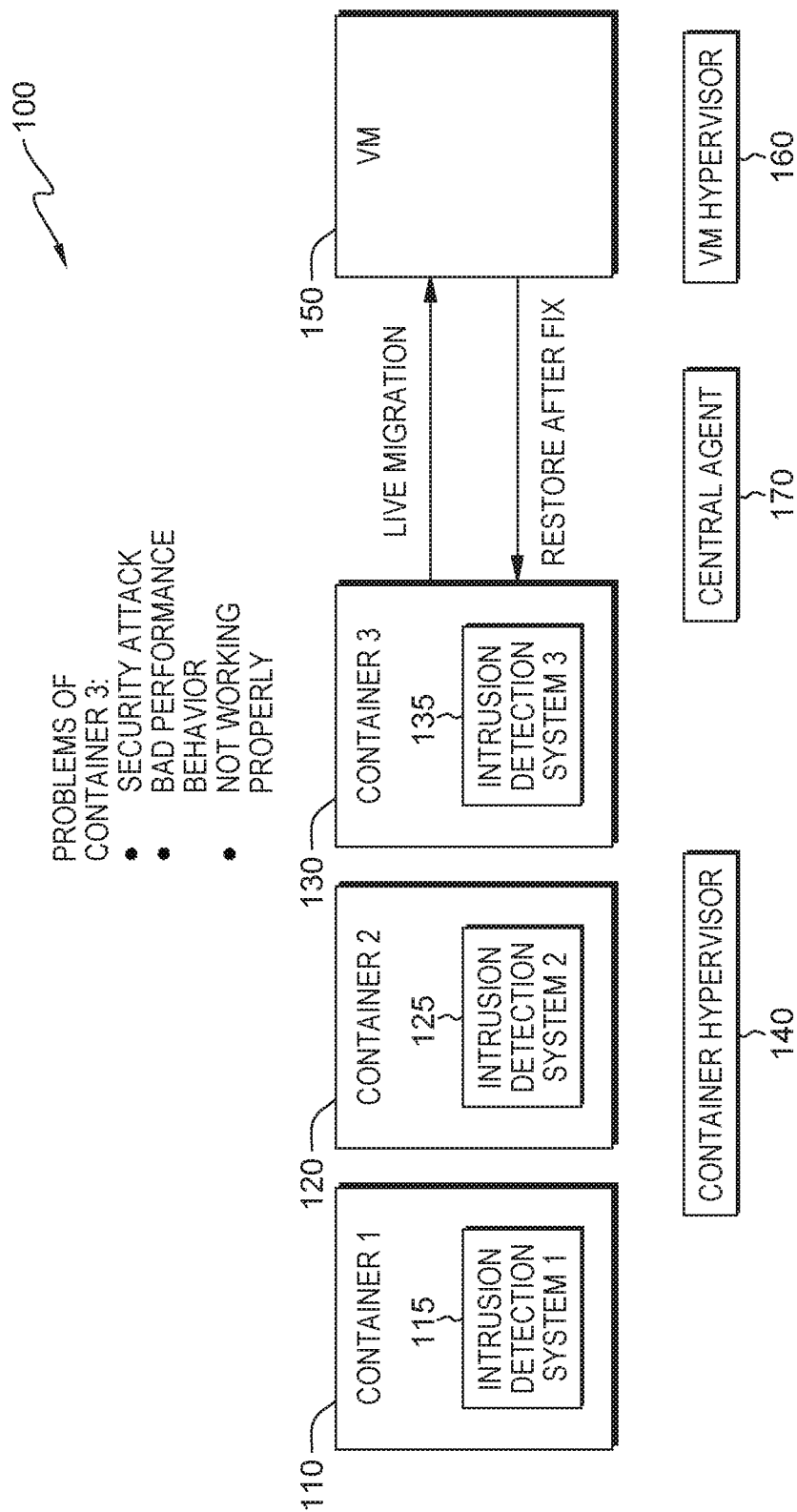
FIG. 1 is a diagram illustrating a system for a security fix of a container in a VM (virtual machine) environment, in accordance with one embodiment of the present invention.

FIG. 1 is a diagram illustrating system 100 for a security fix of a container in a VM (virtual machine) environment, in accordance with one embodiment of the present invention.

System 100 comprises container 1 (110), container 2 (120), and container 3 (130) in a container environment. It should be appreciated that FIG. 1 provides only an illustration; the container environment comprises multiple containers. A container is an operating-system-level virtualization method for running multiple isolated Linux systems (containers) on a control host using a single Linux kernel. In the embodiment of the present invention shown in FIG. 1, each of the containers comprises an intrusion detection system. Container 1 (110) comprises intrusion detection system 1 (115), container 2 (120) comprises intrusion detection system 2 (125), and container 3 (130) comprises intrusion detection system 3 (135). The intrusion detection system is used as an option to detect malicious activities and security issues in each container. System 100 further comprises container hypervisor 140. Hypervisor 140 provides a set of Linux container management tools. System 100 further comprises VM 150 and VM hypervisor 160 which creates and runs VM 150.

System 100 further comprises central agent 170. Central Agent 170 takes action based on reports provided by intrusion detection system 1 (115), intrusion detection system 2 (125), and intrusion detection system 3 (135). Central agent 170 hosts a security database of known security issues including malware, virus, and known bugs. Central agent 170 continuously monitors a plurality of containers against the security database. Central agent 170 maintains an affected group which includes affected containers that have security issues and need to be migrated to respective VMs. In the embodiment shown in FIG. 1, container 3 (130) is such a container in the affected group. For example, container 3 (130) has problems of security attacks, bad performance behaviors, or not working properly. Central agent 170 performs live migration of affected containers to new and clean VMs. For example, as shown in FIG. 1, central agent 170 performs live migration of container 3 (130) to VM 150. Central agent 170 performs detailed tests on the affected containers and applies remedies to the security issues in the VM environments. For example, as shown in FIG. 1, central agent 170 fixes security issues of container 130 in the environment of VM 150. When the security issues are remedied, central agent 170 performs live migration of the VMs to the container infrastructure, restoring the containers in the containers infrastructure. For example, as shown in FIG. 1, central agent 170 performs live migration of VM 150 to the container infrastructure, restoring container 3 (130) in the container infrastructure. If the security issues are persistent, central agent 170 adds the affected containers to quarantine and identifies the affected containers as ones need human intervention.

The following is the process continuously running by central agent 170.

for each container c in environment:

```
        detect_problem(c)
        if problem found then
                add container c to affected_group
done
for each container c in affected_group
        live_migrate_to_new_vm(c)
        add vm created to vm_list
done
for each VM vm in vm_list
        try_fix(vm)
        if fix failed then
                add vm to quarantine and wait for human intervention
        else
                migrate vm snapshot back to original container
done
```

Figure 2:
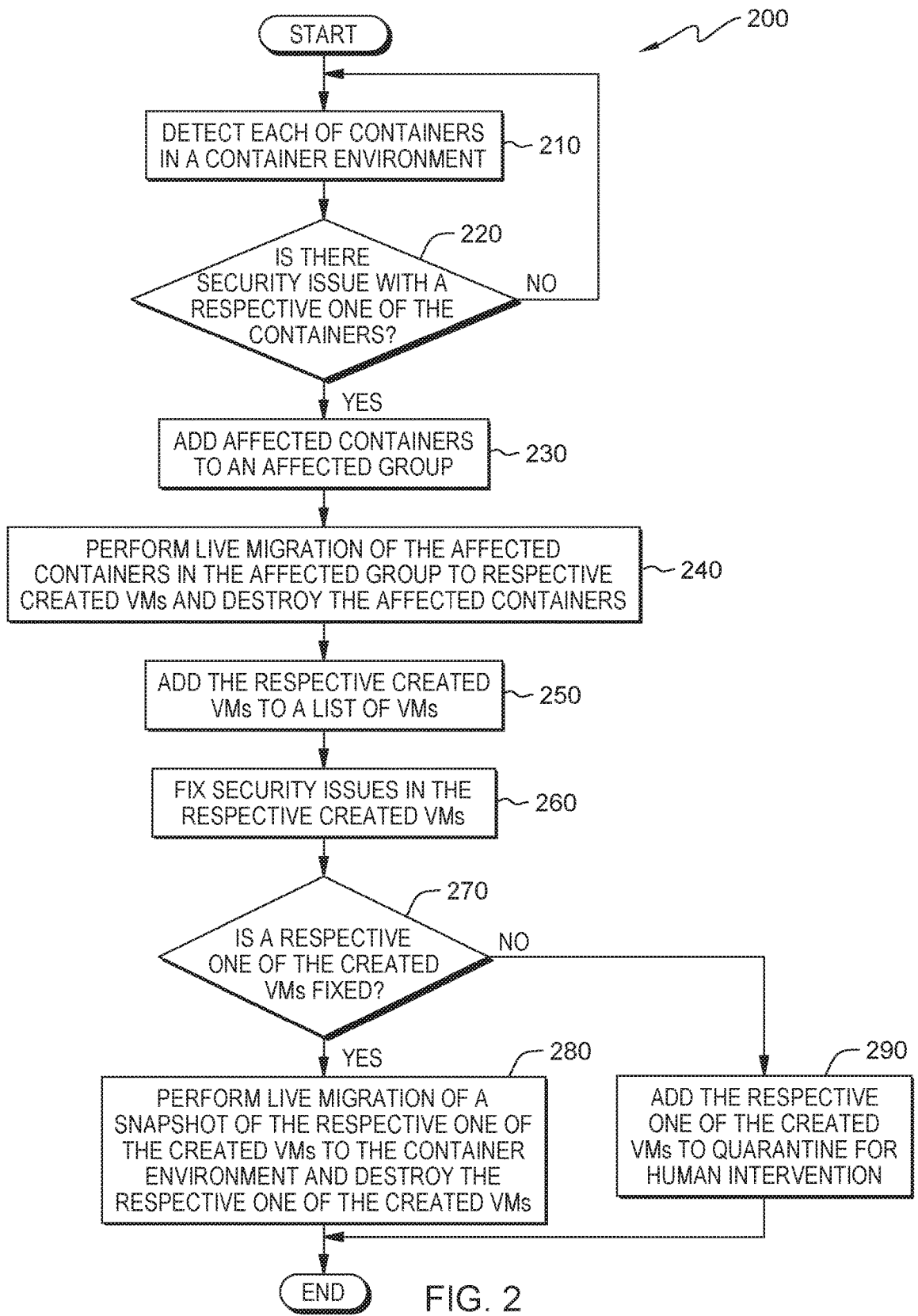
FIG. 2 is a flowchart showing operational steps for a security fix of a container in a VM (virtual machine) environment, in accordance with one embodiment of the present invention.

FIG. 2 is flowchart 200 showing operational steps for a security fix of a container in a VM (virtual machine) environment, in accordance with one embodiment of the present invention. For example, the operational steps are implemented by central agent 170 shown in FIG. 1. At step 210, central agent 170 detects each of containers in a container environment. At step 220, central agent 170 determines whether there is any security issue with a respective one of the containers. In response to determine that there is any security issue with the respective one of the containers (YES branch of step 220), central agent 170 adds the respective one of the container to an affected group. In response to determine that there is no security issue with the respective one of the containers (NO branch of step 220), central agent 170 reiterates steps 210 and 220 until all the containers in the container environment are detected. After finishing detection of all the containers in the container environment, at step 230, central agent 170 add affected containers to the affected group. Steps 210-230 are described in the first block of the pseudo code presented in the previous paragraph.

At step 240, central agent 170 performs live migration of the affected containers in the affected group to respective created VMs and destroys the affected containers. At step 250, central agent 170 adds the respective created VMs to a list of VMs. Steps 240 and 250 are described in the second block of the pseudo code presented in the previous paragraph.

At step 260, central agent 170 fixes security issues in the respective created VMs. At step 270, central agent 170 determines whether a respective one of the created VMs is fixed. In response to determines that the respective one of the created VMs is fixed (YES branch of step 270), at step 280, central agent 170 performs live migration of a snapshot of the respective one of the created VMs to the container environment and destroys the respective one of the created VMs. In response to determines that the respective one of the created VMs is not fixed (NO branch of step 270) or the security issues are persistent, at step 280, central agent 170 adds the respective one of the created VMs to quarantine waiting for human intervention. Steps 260-280 are described in the third block of the pseudo code presented in the previous paragraph.

Figure 3:
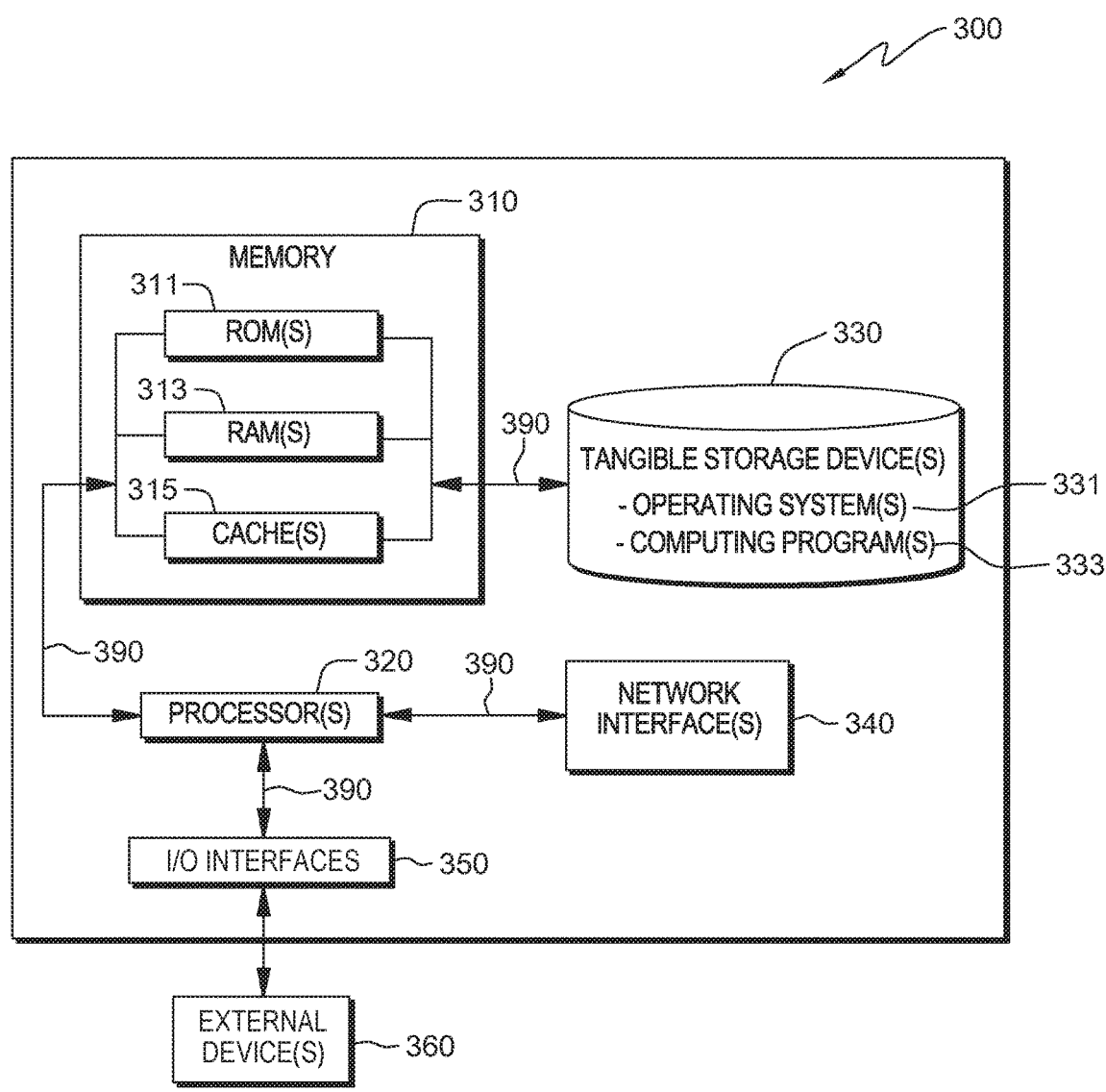
FIG. 3 is a diagram illustrating components of a computer device for hosting a system shown in FIG. 1, in accordance with one embodiment of the present invention.

FIG. 3 is a diagram illustrating components of computer device 300 hosting system 100 shown in FIG. 1, in accordance with one embodiment of the present invention. It should be appreciated that FIG. 3 provides only an illustration of one implementation and does not imply any limitations with regard to the environment in which different embodiments may be implemented. Computer device 300 may be capable of receiving input from a user, executing computer program instructions, and communicating with another computing system via a network.

Referring to FIG. 3, computer device 300 includes processor(s) 320, memory 310, and tangible storage device(s) 330. In FIG. 3, communications among the above-mentioned components of computer device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330. System 100 resides on one or more computer readable tangible storage device(s) 330. Computer device 300 further includes I/O interface(s) 350. I/O interface(s) 350 allows for input and output of data with external device(s) 360 that may be connected to computer device 300. Computer device 300 further includes network interface(s) 340 for communications between computer device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a security fix of a container in a VM (virtual machine) environment, the method comprising:

detecting, by a computer, a container in a container environment, wherein in the container environment the container shares a single kernel with other one or more containers;

determining, by the computer, whether the container in the container environment has a security issue;

creating, by the computer, a virtual machine in a VM (virtual machine) environment, wherein in the VM environment the virtual machine is isolated from other one or more virtual machines;

migrating, by the computer, the container from the container environment to the virtual machine in the VM environment, in response to determining that the container has the security issue;

fixing, by the computer, the security issue of the container in the virtual machine in the VM environment;

determining, by the computer, whether the security issue is fixed in the virtual machine in the VM environment; and migrating, by the computer, a snapshot of the virtual machine in the VM environment to a new container in the container environment, in response to determining that the security issue is fixed in the virtual machine in the VM environment.

2. The method of claim 1, further comprising:
adding, by the computer, the virtual machine in the VM environment to quarantine waiting for human intervention, in response to determining that the security issue is not fixed in the virtual machine in the VM environment.

3. The method of claim 1, further comprising:
destroying, by the computer, the container in the container environment when migrating the container from the container environment to the virtual machine in the VM environment.

4. The method of claim 1, further comprising:
destroying, by the computer, the virtual machine in the VM environment when migrating the snapshot of the virtual machine in the VM environment to the new container in the container environment.

5. The method of claim 1, further comprising:
adding, by the computer, the container to an affected group which includes containers having security issues; and
adding, by the computer, the virtual machine in the VM environment to a list of VMs for the containers having the security issues.

6. The method of claim 1, further comprising:
monitoring, by the computer, a plurality of containers in the container environment, using a security database which includes information of known security issues.

7. A computer program product for a security fix of a container in a VM (virtual machine) environment, the computer program product comprising a non-transitory computer readable storage medium having program code embodied therewith, the program code executable to:
detect a container in a container environment, wherein in the container environment the container shares a single kernel with other one or more containers;
determine whether the container in the container environment has a security issue;
create a virtual machine in a VM (virtual machine) environment, wherein in the VM environment the virtual machine is isolated from other one or more virtual machines;
migrate the container from the container environment to the virtual machine in the VM environment, in response to determining that the container has the security issue;
fix the security issue of the container in the virtual machine in the VM environment;
determine whether the security issue is fixed in the virtual machine in the VM environment; and
migrate a snapshot of the virtual machine in the VM environment to a new container in the container environment, in response to determining that the security issue is fixed in the virtual machine in the VM environment.

8. The computer program product of claim 7, further comprising the program code executable to add the virtual machine in the VM environment to quarantine waiting for human intervention, in response to determining that the security issue is not fixed in the virtual machine in the VM environment.

9. The computer program product of claim 7, further comprising the program code executable to destroy the container in the container environment when migrating the container from the container environment to the virtual machine in the VM environment.

10. The computer program product of claim 7, further comprising the program code executable to destroy the virtual machine in the VM environment when migrating the snapshot of the virtual machine in the VM environment to the new container in the container environment.

11. The computer program product of claim 7, further comprising the program code executable to:
add the container to an affected group which includes containers having security issues; and
add the virtual machine in the VM environment to a list of VMs for the containers having the security issues.

12. The computer program product of claim 7, further comprising the program code executable to monitor a plurality of containers in the container environment, using a security database which includes information of known security issues.

13. A computer system for a security fix of a container in a VM (virtual machine) environment, the computer system comprising:
one or more processors, one or more computer readable tangible storage devices, and program instructions stored on at least one of the one or more computer readable tangible storage devices for execution by at least one of the one or more processors, the program instructions executable to:
detect a container in a container environment, wherein in the container environment the container shares a single kernel with other one or more containers;
determine whether the container in the container environment has a security issue;
create a virtual machine in a VM (virtual machine) environment, wherein in the VM environment the virtual machine is isolated from other one or more virtual machines;
migrate the container from the container environment to the virtual machine in the VM environment, in response to determining that the container has the security issue;
fix the security issue of the container in the virtual machine in the VM environment;
determine whether the security issue is fixed in the virtual machine in the VM environment; and
migrate a snapshot of the virtual machine in the VM environment to a new container in the container environment, in response to determining that the security issue is fixed in the virtual machine in the VM environment.

14. The computer system of claim 13, further comprising the program instructions executable to add the virtual machine in the VM environment to quarantine waiting for human intervention, in response to determining that the security issue is not fixed in the virtual machine in the VM environment.

15. The computer system of claim 13, further comprising the program instructions executable to destroy the container in the container environment when migrating the container from the container environment to the virtual machine in the VM environment.

16. The computer system of claim 13, further comprising the program instructions executable to destroy the virtual machine in the VM environment when migrating the snapshot of the virtual machine in the VM environment to the new container in the container environment.

17. The computer system of claim 13, further comprising the program instructions executable to:
  add the container to an affected group which includes containers having security issues; and
  add the virtual machine in the VM environment to a list of VMs for the containers having the security issues.

18. The computer system of claim 13, further comprising the program instructions executable to monitor a plurality of containers in the container environment, using a security database which includes information of known security issues.

* * * * *